United States Patent
Horwitz et al.

(10) Patent No.: US 6,366,047 B1
(45) Date of Patent: Apr. 2, 2002

(54) MULTI-TRACK ABSOLUTE ENCODER

(75) Inventors: Bruce A. Horwitz, Newton Centre; Catherine E. DeVoe, Newton, both of MA (US)

(73) Assignee: MicroE, Inc., Natick, MA (US)

(*) Notice: Subject to any disclaimer, the term of this patent is extended or adjusted under 35 U.S.C. 154(b) by 0 days.

(21) Appl. No.: 09/554,671

(22) PCT Filed: Nov. 24, 1998

(86) PCT No.: PCT/US98/25146

§ 371 Date: Jul. 13, 2000

§ 102(e) Date: Jul. 13, 2000

(87) PCT Pub. No.: WO99/27324

PCT Pub. Date: Jun. 3, 1999

Related U.S. Application Data

(60) Provisional application No. 60/066,514, filed on Nov. 25, 1997.

(51) Int. Cl.[7] .................................. G05B 19/29
(52) U.S. Cl. ................ 318/602; 318/600; 318/608; 318/562; 318/567; 318/569
(58) Field of Search ................... 318/602, 600, 318/608, 562, 567, 569

(56) References Cited

U.S. PATENT DOCUMENTS

| | | | | |
|---|---|---|---|---|
| 4,310,878 A | * | 1/1982 | Hyatt | 318/608 |
| 4,340,305 A | | 7/1982 | Smith et al. | 356/356 |
| 4,991,125 A | | 2/1991 | Icikawa | 364/560 |
| 5,530,331 A | | 6/1996 | Hanei | 318/592 |

FOREIGN PATENT DOCUMENTS

| | | | |
|---|---|---|---|
| DE | 43 17 064 A1 | 5/1993 | G01B/11/00 |
| EP | 0 325 149 A2 | 1/1989 | G01D/5/244 |
| EP | 0 704 678 A1 | 9/1995 | G01D/5/244 |

* cited by examiner

Primary Examiner—Karen Masih
(74) Attorney, Agent, or Firm—Hale and Dorr LLP

(57) ABSTRACT

A position encoder and a method for estimating absolute position using two or more diffractive grating tracks of differing periods to generate interference fringe patterns on a multi-track sensor. Detectors, corresponding to the diffractive grating tracks, detect the interference fringes. A first processing circuitry coupled to the detectors extract phase signals from the signals from the detectors. A second processing circuitry then estimates the cycle counts of the track signals based on the phase signals from the first processing circuitry. The absolute position is estimated by combining the cycle count, the fractional fringe value, and the grating period.

13 Claims, 5 Drawing Sheets

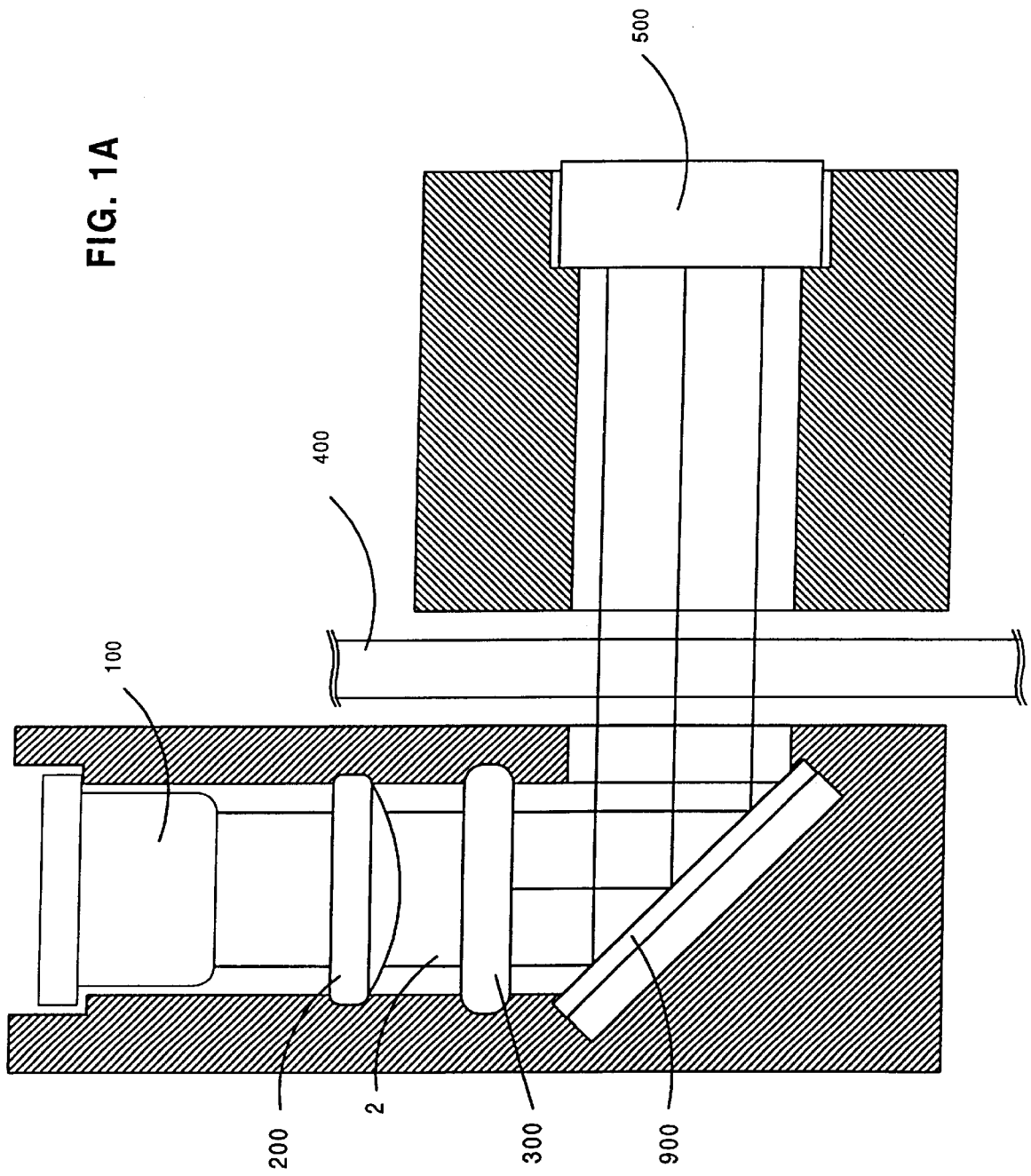

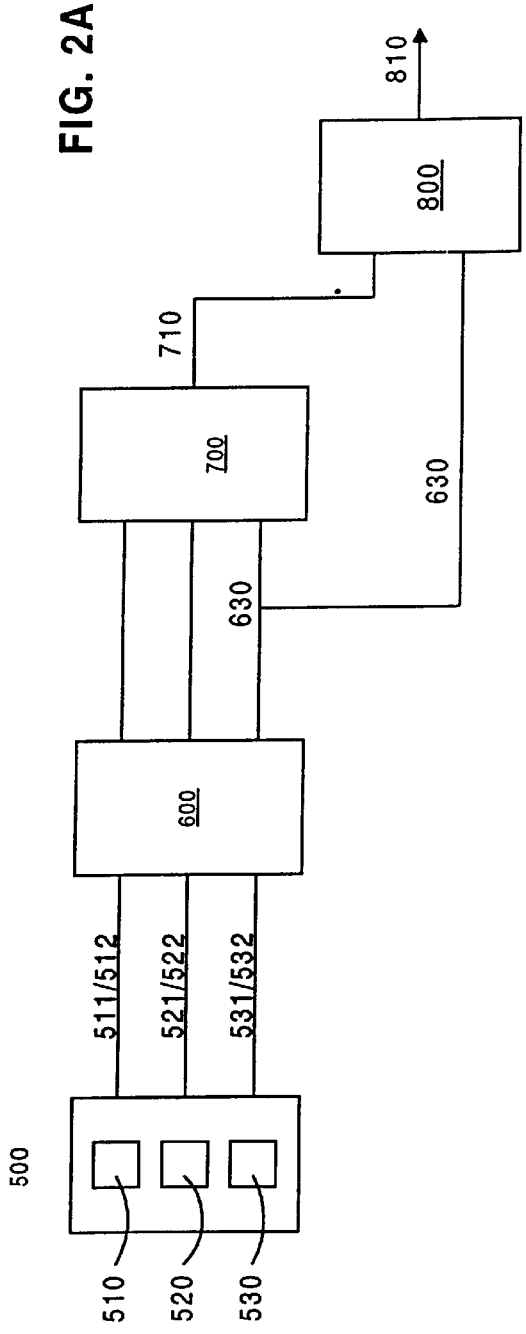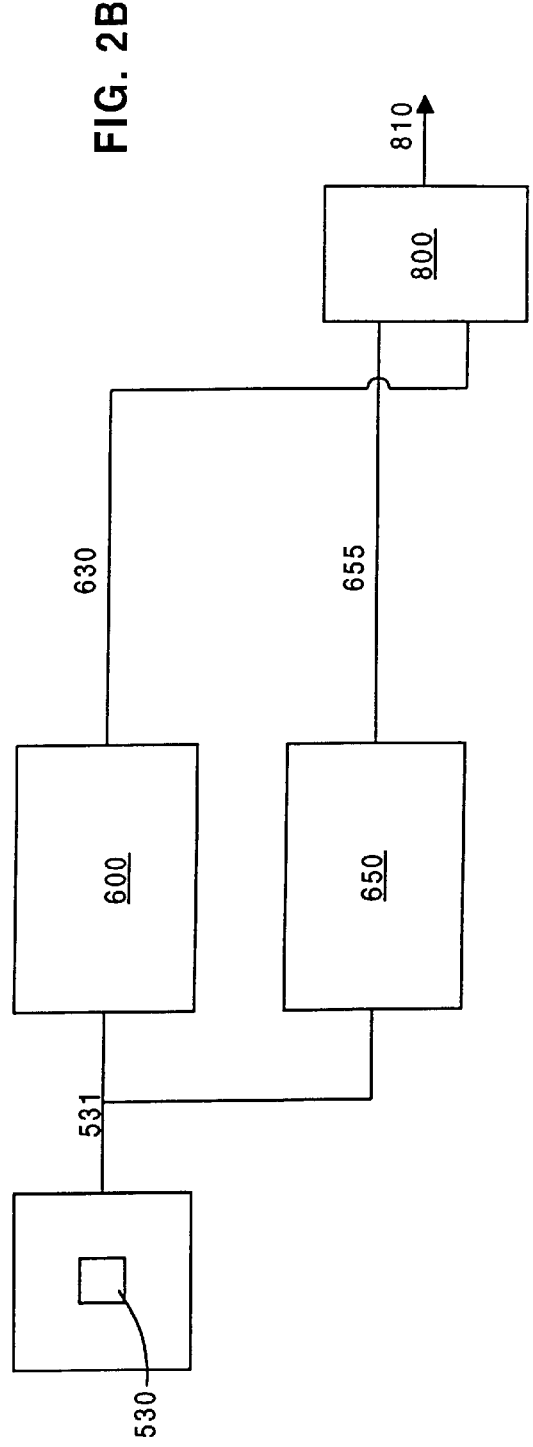

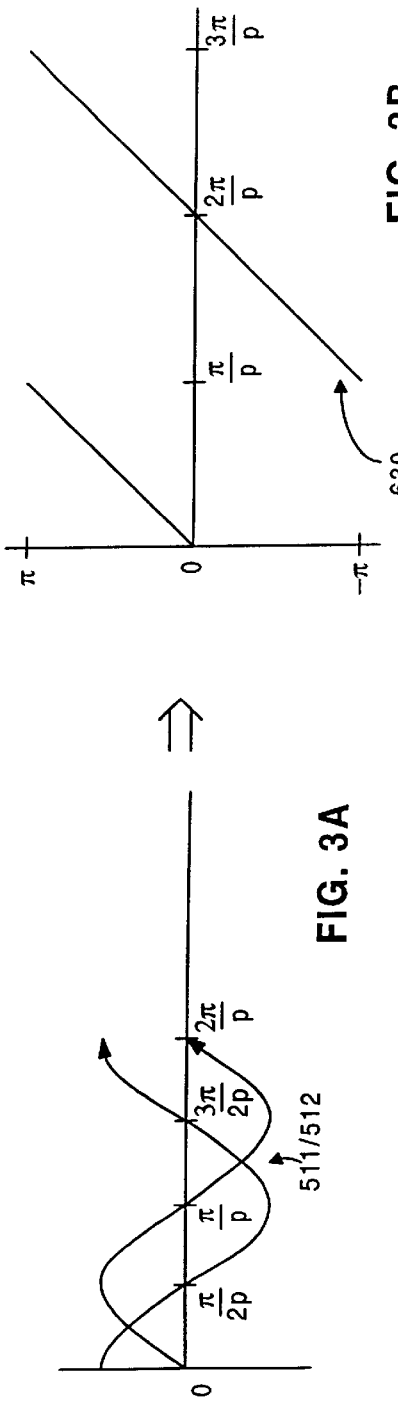
FIG. 3A
FIG. 3B
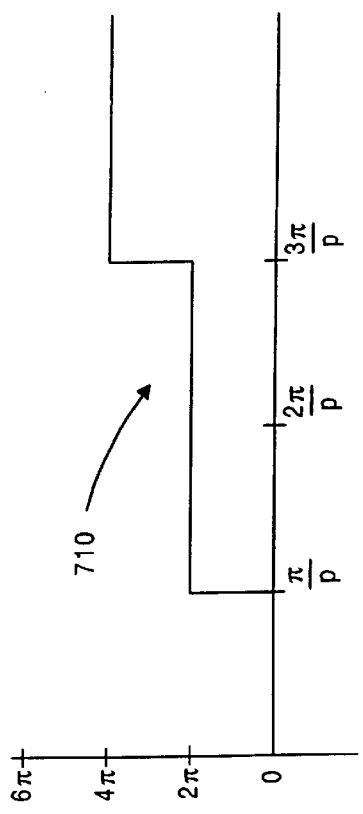
FIG. 3C
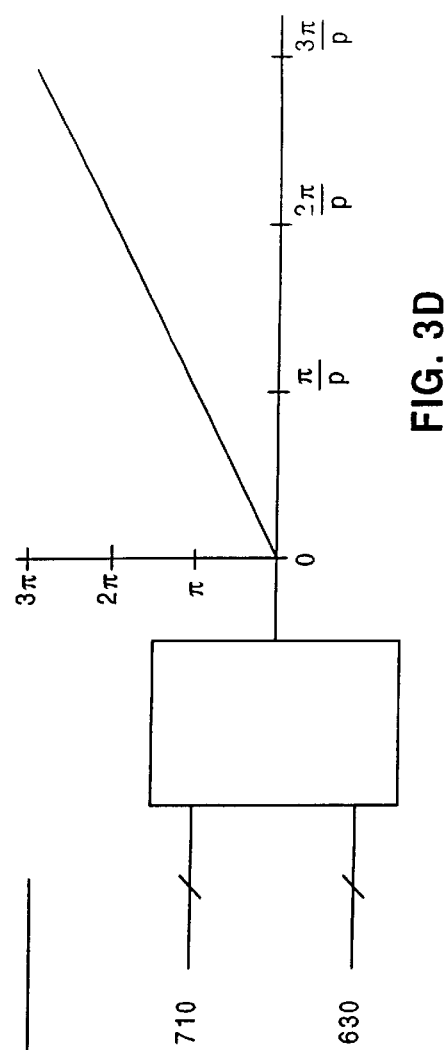
FIG. 3D

MULTI-TRACK ABSOLUTE ENCODER

CROSS-REFERENCE TO RELATED APPLICATION

This application claims priority from Provisional Application No. 60/066,514, which was filed Nov. 25, 1997.

BACKGROUND OF THE INVENTION

1. Field of the Invention

The present invention relates to position encoders, and more particularly, to a multi-track encoder and method for measuring absolute position for position sensing applications.

2. Description of Related Art

Position sensors and precise measurement devices generally require a detector that converts relative motion or position of two elements into an electrical signal. The electrical signal is then processed to determine the position and/or displacement.

Existing diffractive optical encoders for position sensing use the interference pattern from a diffractive grating to produce sinusoidal signals on a detector inserted in the fringe pattern. The sinusoidal signals are then electronically interpolated by an interpolator to detect the position and/or displacement.

SUMMARY OF THE INVENTION

The present invention is a multi-track absolute encoder, hereinafter referred to as a "Multi-Dimensional Encoder" or MDE, and a method for measuring absolute position, using two or more periodic tracks (e.g., diffractive gratings) of slightly differing periods to generate fringe patterns on an appropriately designed multi-track sensor.

The present invention is a position sensing device having a plurality of signal generators that provide signals having different periods in response to movement. A first processing circuitry extracts a position phase from each periodic signal and a second processing circuitry combines the position phases to estimate absolute position.

According to one embodiment of the present invention, the diffractive grating tracks are positioned to be illuminated by a light source. Two or more detectors are positioned to detect the interference fringes from the corresponding diffractive grating tracks. A first processing circuitry, such as an interpolator, is coupled to the detectors for obtaining phase signals from the detectors. The interpolator is coupled to a second processing circuitry, such as a track combiner processor, which is responsive to a combination of the phase signals and identifies the fringe count of one or more of the grating tracks from which the combination of phase signals is estimated to have originated.

The number of tracks and their periods are selected so that the two or more measured phases form a unique vector (in the mathematical sense) for each position in the measurement range. That is, the periods of the grating tracks are selected to be different such that the combination of phase signals from the interference fringes as the grating tracks are moved relative to the detectors defines unique combinations of phases over a range of movement. By mapping this unique vector back into fringe count, the grating displacement can be estimated to within one fringe. Since the output of any one of the tracks is suitable for fine position sensing within each fringe, the combination of the fringe count and the fine phase gives an absolute position reading without any memory of prior position.

The absolute encoder of the present invention is similar to current encoders manufactured by MicroE of Natick, Massachusetts. However, the present invention incorporates additional diffractive grating tracks, a multi-channel detector, which is a detector with parallel linear arrays which act like MicroE's standard "phased array" detector, and a special processing algorithm to convert the multiple measured phases into a single absolute position estimate.

BRIEF DESCRIPTION OF THE DRAWINGS

The invention will be better understood by reference to the attached figures in which:

FIG. 1A is a simplified diagram of the side view of the multi-dimensional absolute encoder of the present invention;

FIG. 2A is a schematic diagram of the detector, interpolator, combiner processor, and output buffer, in accordance with the present invention;

FIG. 2B is a schematic diagram of the detector, interpolator, fringe counter, and output buffer in an incremental encoder;

FIG. 3A is an example of a signal output from the detector;

FIG. 3B is an example of the fractional fringe value signal output from the interpolator;

FIG. 3C is an example of the cycle count estimated by the combiner processor;

FIG. 3D is an example of the estimated absolute position; and

DETAILED DESCRIPTION OF THE INVENTION

The present invention is the first purely diffractive absolute encoder. It is unique in the way it uses its multiple tracks. Unlike other absolute encoders, it neither uses its multiple tracks as binary increments to the absolute range (i.e., like the classic code disks of geometric encoders), nor does it simply use an "N, N–1" cycle approach to create a simple beat frequency to cover the desired measurement range, nor does it use a non-diffractive pseudo-random track. The present invention will be described in more detail below, with reference to FIGS. 1A–4.

Figure 1B:
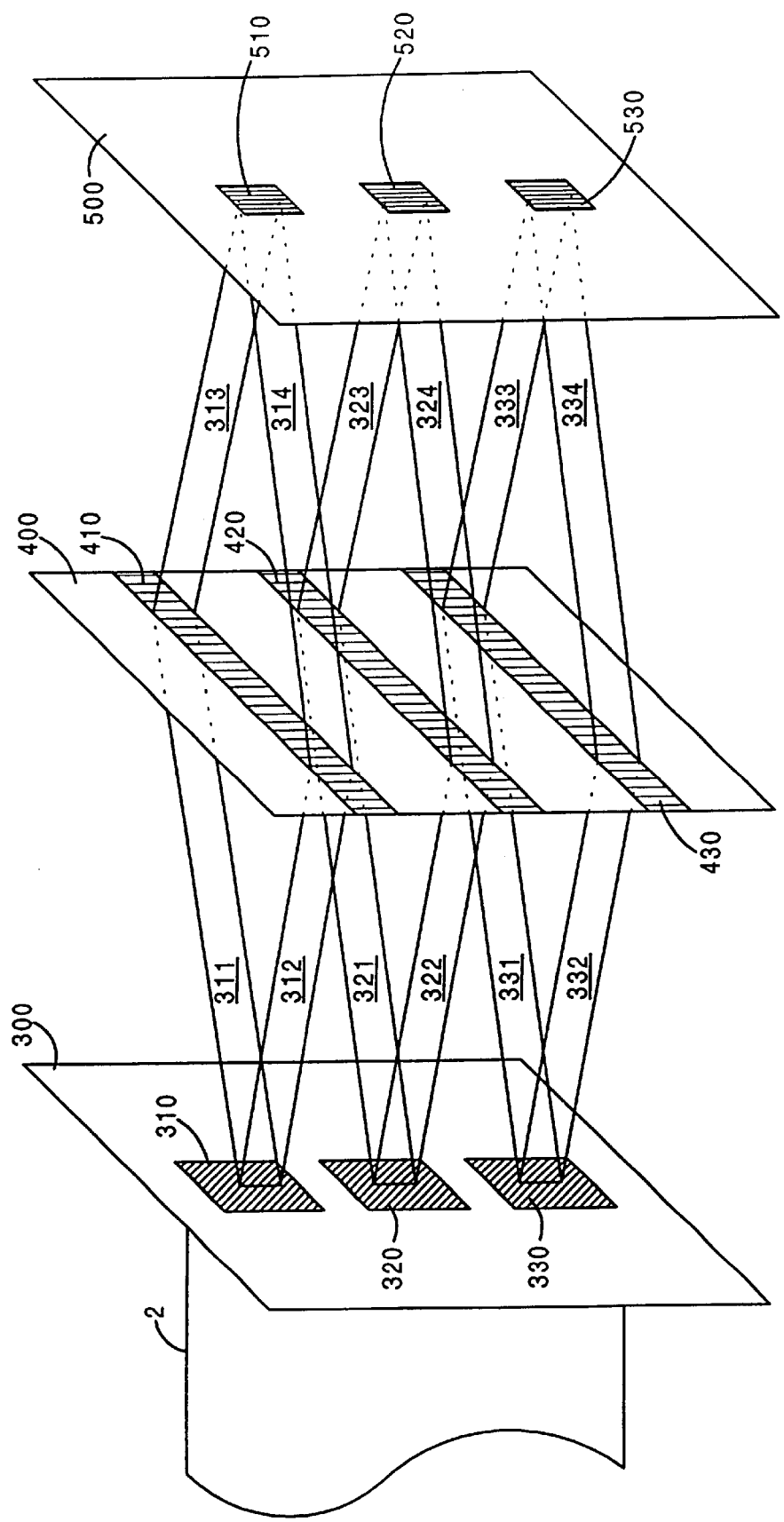
FIG. 1B is a simplified functional diagram of a collimated beam, wavefront compensator, multi-track diffractive grating, and a detector, in accordance with the present invention.

From a mechanical point of view, the present invention comprises two or more "standard" MicroE encoders packaged into a single encoder head, along with an appropriately designed multi-track grating, as shown in FIGS. 1A and 1B. For example, a G1100 series encoder, manufactured by MicroE of Natick, Massachusetts, is such a "standard" MicroB encoder. Details of the operation of these encoders can be found in U.S. Pat. Nos. 5,486,923 and 5,559,600, assigned to MicroE, the assignee of the subject application, and which are hereby incorporated by reference.

Referring to FIG. 1A, a preferred embodiment of the present invention includes a light source 100, a wavefront compensator 300, a mirror 900, a multi-track diffractive grating 400, and a detector 500. As shown in FIG. 1A, a light source 100, such as a laser diode, is used to provide a quasi-monochromatic, spatially coherent light. The diverging laser beam is collimated by a collimating lens 200 to provide a collimated beam 2. The collimated beam 2 then passes through a wavefront compensator 300, such as the triple wavefront compensator shown in FIGS. 1A and 1B. It is to be noted that although FIG. 1B shows a three-track system, more than three tracks may be employed within the spirit of the present multi-dimensional encoder invention.

A mirror 900 then deflects the light beams 311, 312, 321, 322, 331, 332 such that they are directed to pass through a multi-track diffractive grating 400, such as the three-track diffractive grating 400 with triple linear diffractive gratings 410, 420, 430 shown in FIG. 1B. The multi-track diffractive grating 400 is positioned such that there is a one-to-one matching of the light beams 311, 312, 321, 322, 331, 332 with the grating tracks 410, 420, 430, as shown in FIG. 1B. The multi-track diffractive grating 400 can be either radial or linear. A linear grating 400 is shown for simplicity. The grating tracks 410, 420, 430 can be either combined into one device, such as the multi-track diffractive grating 400 shown in FIG. 1B, or the tracks 410, 420, 430 can be individual devices.

The multi-track diffractive grating 400 diffracts the light beams 311, 312, 321, 322, 331, 332 into discrete orders. The grating tracks 410, 420, 430 diffract and redirect the light beams 311, 312, 321, 322, 331, 332. After passing through the grating tracks 410, 420, 430, the light beams 313, 314, 323, 324, 333, 334 propagate to the detector 500.

The diffracted orders of the light beams 313, 314, 323, 324, 333, 334 interfere to form linear sinusoidal fringes. The period of these fringes is determined by the grating track period and the wavefront compensator 300. The periods of the grating tracks 410, 420, 430 are different from each other and are selected to provide the greatest measurement range given the available measurement accuracy.

The detector 500 then receives the interference fringes of the light beams 313, 314, 323, 324, 333, 334 created by the diffractive grating tracks 410, 420, 430. The detector 500 shown in FIG. 1B is a detector having three parallel linear detector arrays 510, 520, 530, where one of the detector arrays 510, 520, 530 corresponds to each grating track 410, 420, 430.

As shown in FIG. 2A, the output signals 511/512, 521/523, 531/532 from each detector array 510, 520, 530 are processed by processing circuitry, such as an interpolator 600, using standard interpolation techniques, creating two or more periodic phase signals, each of which represents the fractional fringe position for its respective grating track 410, 420, 430. The interpolator 600 uses multi-phased signals to interpolate between periods of periodic signals. The output signals 511/512, 521/522, 531/532 are analog sine/cosine signals. The interpolator may be a digital processor.

The interpolator 600 may also include front end processing, including compensation for gain differences, amplitude offsets, and phase offsets, to ensure correct phase signals before interpolation, such as the error compensation techniques found in the MicroE MC2000 motion control board used with the MicroE G1100 series encoders.

In an incremental encoder, the fringes produced by a single track grating increase in phase linearly with grating displacement. As phase is measurable modulo $2\pi$ only, a fringe counter is normally included in a processor of an incremental encoder to keep track of the number of cycles that have gone by, as shown in FIG. 2B.

In order to calculate the non-modulo position of the grating, the fringe count (integer cycles) 655 and the fractional cycle estimate from an interpolator are combined. By multiplying this mixed number estimate of fringes by the a priori knowledge of the fringe period, the fringe count can be converted to physical displacement, relative to the fringe counter initialization point.

No cycle counter is required in this processor as would be in an incremental encoder. Each phase signal is fed to a "track combiner" processor 700, as shown in FIG. 2A. The track combiner processor 700 may be a digital processor and this processor 700 estimates the cycle count(s) of one or more of the track signals, based only on the immediate phase values available. The cycle count 710 and the fractional fringe value 630 (digital phase values), combined with the a priori knowledge of the grating period, permit an estimate of the absolute position 810. As an example, the cycle count 710 would provide the upper bits, while the fractional fringe value 630 would provide the lower bits, for example the lowest 12 bits of the estimated phase position. See FIG. 3D.

Output signals from the system of FIG. 2A are illustrated in FIGS. 3A–3D. FIG. 3A provides an example of the signal 511/512 output from the detector 500. FIG. 3B is an example of the fractional fringe value signal 630 output from the interpolator 600. FIG. 3C provides an example of the cycle count 710 estimated by the "track combiner" processor 700. FIG. 3D is an example of the estimated absolute position.

An MDE of the present invention can be implemented in either linear or rotary encoder applications and can be used with any position sensing technology based on periodic signals. For example, the MDE approach could be applied to the multi-track periodic capacitive sensors that have been used in incremental encoders, making this technology suitable for a true absolute encoder. When used in a 360 degree rotary application with the diffractive technology described in the above-referenced U.S. Pat. Nos. 5,486,923 and 5,559,600, which always produces an even number of fringes around a disk, the MDE of the present invention will require an extra, binary indicator track to indicate in which 180 degree sector the sensor is.

From the above description of the present invention, it should be clear that the key principle of operation for the absolute MDE is the understanding of how to create and process the two or more sets of diffractive fringes.

In order to create an absolute encoder of the present invention, the fringe counter (position memory) used in incremental encoders, such as the one shown in FIG. 2B, is eliminated, but there is still a need to estimate the integer number of fringes. This estimate is obtained by the fact that each track 410, 420, 430 on the multi-track diffractive grating 400 has a slightly different period, so the fringes produced by the tracks 410, 420, 430 change phase with grating position at a slightly different rate from each other.

In this regard, the present invention is similar to any beat frequency phenomenon. However, the present invention differs from a simple beat frequency approach in the number of fringes used, the way frequencies are selected, and the processing algorithm applied to the resulting fringe phases.

In the present invention, it is desired to uniformly spread the measured information in an N-dimensional space, where N is the number of grating tracks. This uniform spread is achieved by the following steps:

1) Select a convenient base period, P, for which the encoders work well and which will provide the required resolution, r. For example, MicroE G1100 series encoders typically have:

5 microns<2P<60 microns, and, if 12 bit interpolation is used,

P≦4096×r.

2) N is selected based on the accuracy, A, of to the measurement of each individual track's phase and the desired range, R, using the following formula:

N=Ceiling [log(R/P)/Alog(2)+1], where A is the number of bits of accuracy and the Ceiling function returns the next highest integer.

3) Finally, the remaining N−1 periods are selected by choosing physically convenient periods close to the base period, applying the criterion that the number of fringes that each track 410, 420, 430 produces in the range is both integer and has at least one factor that is not common to all other tracks 410, 420, 430. That is, while a track 410, 420, 430 may share factors on a pairwise basis with the other tracks 410, 420, 430, it must have at least one factor that is not shared with all the other tracks 410, 420, 430. In order to make all N periods convenient for fabrication, the numerical value of the range can be adjusted slightly.

As an example of the present invention, consider an absolute encoder required to measure a 32 mm range with a 12 nanometer resolution. Also assume that phase can be measured with 8-bit accuracy. For this system, the base period can be chosen to be 12.4 microns, which is both between 5 and 60 microns and less than 4096 times the 12 nanometers resolution.

Since the measurement range, R, is 32 mm, the formula provides the number of tracks, N, as 3. Finally, we can select the other two fringe periods to be 12.3 and 12.6 microns.

TABLE 1

Example parameters

| Track Period (microns) | Number of Fringes in 32.0292 mm | Factors |
| --- | --- | --- |
| 12.3 | 2604 | 2, 3, 7, 31 |
| 12.4 | 2583 | 3, 7, 41 |
| 12.6 | 2542 | 2, 31, 41 |

As seen in the attached table, there is no common factor between the number of fringes for all three tracks, and the numeric value of the range has been adjusted to be 32.0292 mm.

Figure 4:
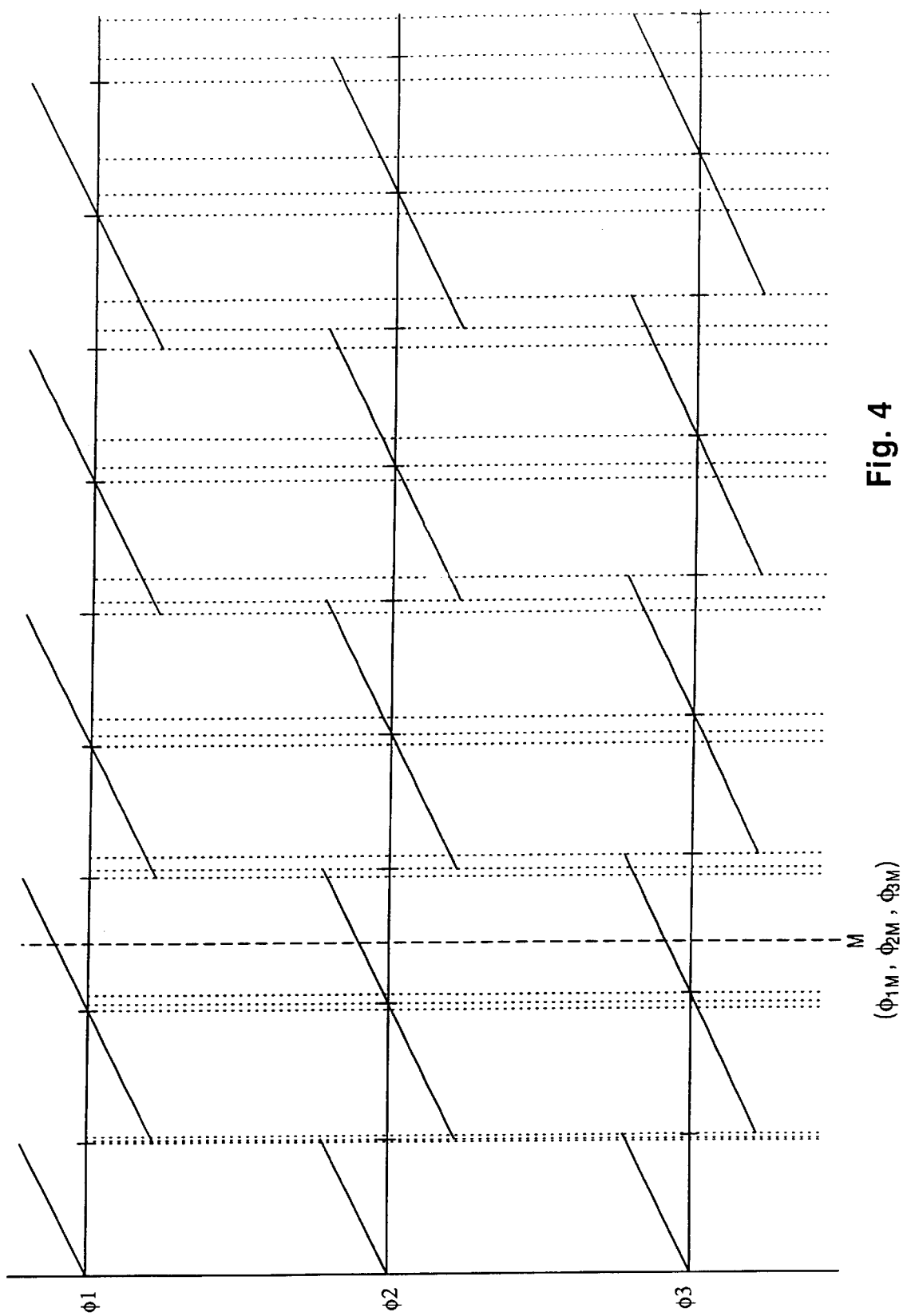
FIG. 4 illustrates phase signals that might be provided by the interpolator to the combiner, in accordance with the present invention.

FIG. 4 illustrates phase signals $\phi1$, $\phi2$, and $\phi3$ such as might be provided by interpolator 600 to the "track combiner" processor 700 in FIG. 2A. It should be noted that the period of each phase signal differs from the others, and that at any point, M, along the range of movement, the instantaneous phases, $\phi_{1M}$, $\phi_{2M}$, and $\phi_{3M}$, differ from one another uniquely. The phase periods shown in FIG. 4 cover only a portion of the range. It is to be noted that FIG. 4 is for illustration only and not meant to precisely depict the relative phase relationships.

There are several ways to process the phases produced by an MDE encoder of the present invention. The conceptually easiest approach is to use a large look-up table. That is, since the set of N phases ("N-vector") produced by the N gratings is unique within the range, these N-vectors can be precalculated for each possible position and the answer may simply be looked up on the table. This approach can be preformed very quickly, but requires a large read-only storage memory.

At the other extreme, one may use an algorithm for converting the measured N-vectors into absolute position with no memory requirements. Although the algorithm is computationally efficient, by definition it has a higher processor requirement than the simple look-up table approach. Intermediate processing stratagems, in which the algorithm solution is used to reduce the size of the look-up table are possible (and possibly preferred, depending on the available resources) where the algorithm can be determined and performed computationally efficiently.

In other words, for example, the first part of the processing may be performed using the algorithm or analytically, and the remaining part of the processing can then be done using a look-up table. For example, the algorithm may be used to project the point inside the cube defined by the tip of the N-vector. The look-up table may then be used to find the intercepts.

The algorithm described above presumes an understanding of the concept of N-dimensional space, where N can be greater than 3. For the sake of clarity, the algorithm will be described in further detail below by referring to the 3-dimensional example discussed above, but those skilled in the art will understand its extension to higher dimensional spaces.

The 3-vector formed from the three measured phases traces a series of parallel line segments confined in a cube. The sides of the cube are each one cycle long. As long as the grating substrate moves within the predefined range, these line segments are non-repeating. Each line segment can be mapped to a particular fringe in each of the tracks 410, 420, 430. The goal of this algorithm is to determine the fringe number (count) for a pre-selected "base" track from the 3-vector.

The first step in the algorithm is to project the point inside the cube defined by the tip of the 3-vector down its line segment to find its intercept with the plane associated with one face of the cube, specifically the face for which the base track phase equals 0. The following formulae are used:

$$I_x=\text{Round}[\text{mod}(p1-p3*T3/T1)*Lx)]/Lx,$$

and $$I_y=\text{Round}[\text{mod}(p2-p3*T3/T2)*Ly)]/Ly,$$

where the third track has been designated the base track, $I_x$ and $I_y$ are the coordinates of the intercept in the P3 plane, pn is the phase from the nth track, Tn is the period of the nth fringe, and the L's are greatest common factors between the tracks 410, 420, 430 when taken pairwise. Note that the mod function (here used with a base of unity) restricts the intercepts to be within the face of the unit cube and the Round function eliminates the ambiguities from measurement errors. It can be shown that these intercept points lie along identifiable parallel line segments in the unit square that forms one side of the cube.

The second step in the algorithm is to project these calculated intercepts back along their line segments to find where they in turn intercept one axis:

$$I=\text{mod}(Ix-Iy*Ly/Lx)$$

The third step in the algorithm is to calculate what has been defined as the "overlap". The overlap is the number of beat cycles through which the combined periodic signals have passed. The total number of overlaps OV is the ratio of the range to the beat period. It can be shown that for the MDE:

$$\text{Beat}=Lx*Ly/|Lx-Ly|,$$

and $$OV=|Lx-Ly|,$$

and the overlap value for a particular data point is $$Overlap=mod_{ov}(I*Lx),$$

where the base for the mod function is OV. The function 'Overlap' should be tested to see that it is a monotonic function of I. If it is not, the selection of various grating periods (and thus the common factors, L) must be adjusted on an ad hoc basis until this condition is met. The look up table approaches for estimating the absolute position are not subject to this condition.

Finally, this information can be combined to estimate the position:

$$P=[(Overlap+1)*Beat+Iy*Ly+p3]*T3,$$

where each term in the above estimate is calculated from the instantaneous measurement of the 3 fringe phases.

Although the present invention has been described by way of particular examples, it is to be understood that invention is not limited to the particular examples described. For example, although the present invention has been described generally in terms of diffractive optical encoders, the present invention may also apply to other types of encoders, including geometric optical encoders, capacitative displacement encoders, and magnetic displacement encoders. Moreover, while the functional components of the present invention are described and illustrated as distinct components, it is to be understood that they may be combined into a single component or assembly, or distributed among several components or assemblies, within the spirit of the present invention.

The terms and expressions which have been employed herein are used as terms of description and not of limitation. There is no intention in the use of such terms and expressions of excluding equivalents of the features shown and described, or portions thereof, it being recognized that various modifications are possible within the scope of the invention claimed.

What is claimed is:

1. A method for estimating absolute position in a three-track position encoder, comprising the steps of:

passing light through a plurality of diffractive grating tracks to form interference fringes, wherein each diffractive grating track has a different period from the other diffractive grating tracks and wherein one of the diffractive grating tracks is selected to be the base track;

detecting the interference fringes with a detector;

measuring phases from the interference fringes;

forming a vector by combining the measured phases, wherein the vector traces a series of parallel line segments confined in a cube;

finding intercepts of a tip of the vector, using the following equations:

$$I_x=\text{Round}\,[mod(p1-p3*T3/T1)*Lx)]/Lx$$

$$I_y=\text{Round}\,[mod(p2-p3*T3/T2)*Ly)]/Ly$$

wherein the intercept is with a plane associated with a face of the cube for which the base track phase equals zero and wherein $I_x$ and $I_y$ are the coordinates of the intercept in the base track plane, pn is the phase from the nth track, Tn is the period of the nth track, and L is a greatest common factor between the tracks when taken pairwise;

projecting the intercepts back along their line segments to find where the intercepts intercept one axis, using the following equation:

$$I=mod(I_x-I_y*LY/Lx);$$

calculating an overlap value, wherein the overlap value is a number of beat cycles through which the combined signals have passed, using the following equations:

$$Beat=Lx*Ly/|Lx-Ly|$$

$$OV=|Lx-Ly|$$

overlap value=$mod_{ov}(I*Lx)$; and estimating absolute position by combining the overlap value, the beat, the phase from the base track, and the period of the base track, using the following equation:

$$P=[(\text{overlap value}+1)*Beat+Iy*Ly+p3]*T3.$$

2. A position encoder, comprising:

a source of light;

a multi-track diffractive grating including N diffractive gratings, N being an integer greater than or equal to three, each of the N diffractive gratings extending over a range R and being positioned to be illuminated by the source of light, light incident on each of the N diffractive gratings generating interference fringes, each of the N diffractive gratings being associated with a period and an integer, a product of the period and the integer associated with each of the N diffractive gratings being substantially equal to the range R, the integer associated with each of the N diffractive gratings being equal to a product of a set of factors, each set of factors including at least one factor not included in all of the other sets; and N detectors, each of the N detectors being positioned for movement with respect to the multi-track diffractive grating, interference fringes generated by light incident on each of the N diffractive gratings being incident on a corresponding one of the N detectors.

3. A position encoder according to claim 2, each of the N detectors generating an output signal representative of a phase of the interference fringes incident on that detector.

4. A position encoder according to claim 3, further including digital circuitry, the digital circuitry receiving the output signals generated by the N detectors and generating digital representations of the phases of the interference fringes incident on each of the N detectors.

5. A position encoder according to claim 4, the digital circuitry generating a signal representative of the position of the detectors relative to the multi-track diffractive grating.

6. A position encoder according to claim 5, wherein N is selected according to the formula N=Ceiling[log(R/P)/Alog (2)+1], wherein P is the period of one of the N diffractive gratings and A represents a number of bits of accuracy provided by the digital circuitry.

7. A position encoder according to claim 6, wherein a product of two and the period P is greater than five microns and is less than sixty microns.

8. A position encoder according to claim 2, further including an interpolator, the interpolator receiving the output signals generated by the N detectors and generating therefrom N fractional fringe value signals, each of the N fractional fringe value signals being a digital representation of the phase of the interference fringes incident on one of the N detectors.

9. A position encoder according to claim 8, further including a track combiner, the track combiner receiving at least the N fractional fringe value signals and generating therefrom an estimate of the position of the N detectors relative to the multi-track diffractive grating.

10. A position encoder according to claim 9, wherein the track combiner comprises a digital processor.

11. A position encoder according to claim 8, wherein the interpolator comprises a digital processor.

12. A position encoder, comprising:

a source of light;

a multi-track diffractive grating including a first diffractive grating, a second diffractive grating, and a third diffractive grating, the first, second, and third diffractive gratings extending over a range R and being positioned to be illuminated by the source of light, the first diffractive grating being characterized by a first period, the second diffractive grating being characterized by a second period different than the first period, the third diffractive grating being characterized by a third period different than the first and second periods, a product of the first period and a first integer being substantially equal to the range R, a product of the second period and a second integer being substantially equal to the range R, a product of the third period and a third integer being substantially equal to the range R, the first integer being equal to a product of a first set of factors, the second integer being equal to a product of a second set of factors, the third integer being equal to a product of a third set of factors, each of the first, second, and third sets including at least one factor not included in the other sets;

a first detector, a second detector, and a third detector, the first, second, and third detectors being positioned for movement with respect to the multi-track diffractive grating, interference fringes generated by light incident on the first diffractive grating being incident on the first detector, interference fringes generated by light incident on the second diffractive grating being incident on the second detector, interference fringes generated by light incident on the third diffractive grating being incident on the third detector.

13. A method of selecting a number N of diffractive gratings to be included in a multi-grating absolute encoder and for selecting a period of each of the gratings, the encoder including a multi-track grating, N detectors, and a light source, each of the N diffractive gratings being disposed on the multi-track grating, the N diffractive gratings being positioned to be illuminated by the light source, light incident on each of the N diffractive gratings generating interference fringes, the N detectors being positioned for movement with respect to the multi-track grating, interference fringes generated by light incident on each of the N diffractive gratings being incident on a corresponding one of the N detectors, the method comprising:

selecting a desired measurement range R for the encoder;

determining a number N of diffraction gratings to be included the encoder according to the formula $N = \text{Ceiling}[\log(R/P)/A*\log(2)+1]$, wherein A represents a number of bits of accuracy of the encoder, and wherein P represents a selected period of one of the N diffraction gratings;

adjusting the range R or the period P or the range R and the period P, if necessary, to insure that range R divided by the period P is an integer; and selecting the periods of the remaining N−1 diffractive gratings such that for each of the remaining N−1 diffractive gratings, a quotient of the period and the range R is an integer, and such that the integer associated with each of the N gratings includes at least one prime factor that is not a factor of any of the integers associated with the other gratings.

* * * * *